(12) United States Patent
Okigami

(10) Patent No.: US 11,249,704 B2
(45) Date of Patent: Feb. 15, 2022

(54) DISPLAY CONTROL DEVICE, DISPLAY CONTROL METHOD, AND DISPLAY SYSTEM

(71) Applicant: SHARP KABUSHIKI KAISHA, Sakai (JP)

(72) Inventor: Masafumi Okigami, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/035,634

(22) Filed: Sep. 28, 2020

(65) Prior Publication Data
US 2021/0103415 A1    Apr. 8, 2021

(30) Foreign Application Priority Data
Oct. 3, 2019   (JP) .............................. JP2019-183031

(51) Int. Cl.
*G06F 3/12*        (2006.01)
*H04N 1/00*        (2006.01)

(52) U.S. Cl.
CPC .......... *G06F 3/1256* (2013.01); *G06F 3/1234* (2013.01); *G06F 3/1259* (2013.01); *H04N 1/00413* (2013.01)

(58) Field of Classification Search
CPC .... G06F 3/1256; G06F 3/1234; G06F 3/1259; G06F 3/1204; G06F 3/1267; G06F 3/1285; H04N 1/00413; H04N 1/00129; H04N 2201/0089; H04N 1/00506; H04N 1/00448; G09G 2320/0613
See application file for complete search history.

(56) References Cited

U.S. PATENT DOCUMENTS

| | | | |
|---|---|---|---|
| 10,491,659 B1 * | 11/2019 | Skyrm | .................. H04L 65/601 |
| 2006/0074923 A1 * | 4/2006 | Gower | ...................... G06F 16/58 |
| 2009/0276313 A1 * | 11/2009 | Wilhelm | ............ G06Q 30/0641 |
| | | | 705/14.53 |
| 2016/0142564 A1 * | 5/2016 | Kida | ................... H04N 1/00129 |
| | | | 358/1.15 |

FOREIGN PATENT DOCUMENTS

JP    2016-096510 A    5/2016

\* cited by examiner

*Primary Examiner* — Iriana Cruz
(74) *Attorney, Agent, or Firm* — ScienBiziP, P.C.

(57) ABSTRACT

The present invention is a display control device including a storage unit that stores content and a playlist, and a controller that displays the content on a display device based on the playlist. When additional content is stored in a prescribed storage area, the additional content is acquired, and the additional content is displayed on the display device.

14 Claims, 20 Drawing Sheets

| FILE NAME | DISPLAY TIME |
|---|---|
| TRAVEL EXPENSE APPLICATION.jpg | 00:00:10 |
| RECYCLING ACTIVITIES.jpg | 00:00:10 |
| ENERGY SAVING PROMOTION.jpg | 00:00:10 |
| ⋮ | ⋮ |

FIG. 4

| FILE NAME | DISPLAY TIME |
|---|---|
| TRAVEL EXPENSE APPLICATION.jpg | 00:00:10 |
| RECYCLING ACTIVITIES.jpg | 00:00:10 |
| ENERGY SAVING PROMOTION.jpg | 00:00:10 |
| ⋮ | ⋮ |

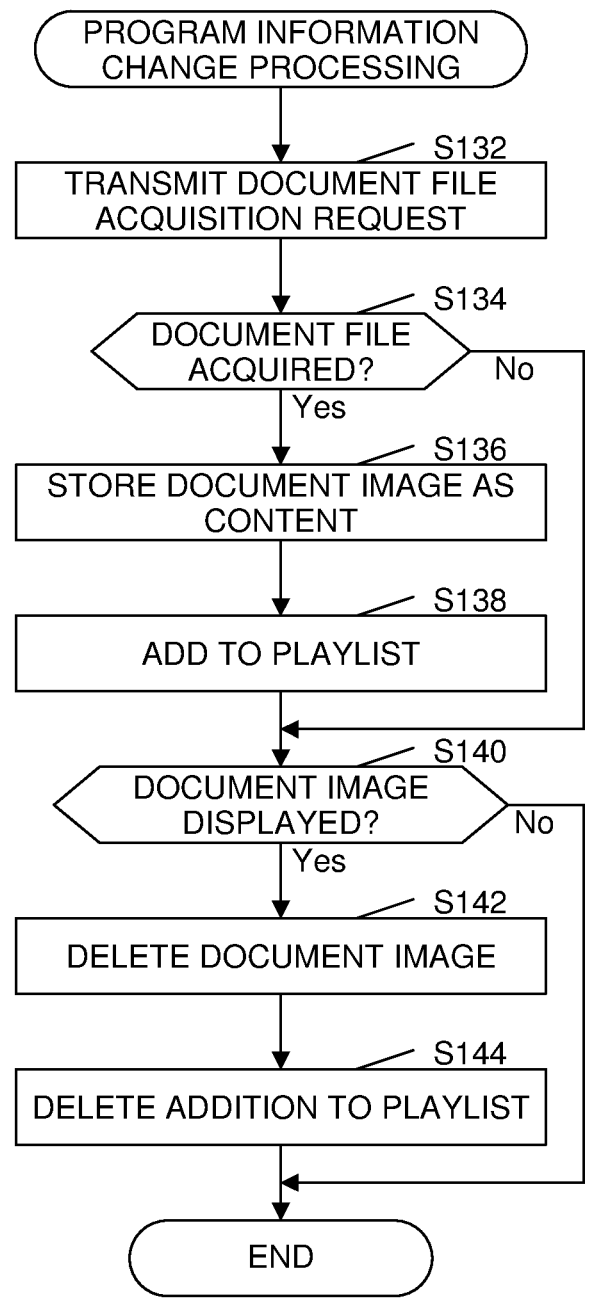

| CONTENT ID | DISPLAY TIME |
|---|---|
| TRAVEL EXPENSE APPLICATION.jpg | 00:00:10 |
| RECYCLING ACTIVITIES.jpg | 00:00:10 |
| ENERGY SAVING PROMOTION.jpg | 00:00:10 |

| CONTENT ID | DISPLAY TIME |
|---|---|
| TRAVEL EXPENSE APPLICATION.jpg | 00:00:10 |
| RECYCLING ACTIVITIES.jpg | 00:00:10 |
| ENERGY SAVING PROMOTION.jpg | 00:00:10 |
| 0612345678_20190723_134523.jpg | 00:00:10 |
| 0398765432_20190723_134529.jpg | 00:00:10 |

E100
C100
C102

D100

FAX RECEIVED.(FAX NUMBER:06-1234-5678)

| SENDER INFORMATION | | DISPLAY RESTRICTION |
|---|---|---|
| ITEM NAME | ITEM VALUE | |
| TRANSMISSION SOURCE FACSIMILE NUMBER | 06-1234-5678 | YES |
| TRANSMISSION SOURCE FACSIMILE NUMBER | 03-1234-5678 | NO |
| TRANSMISSION SOURCE FACSIMILE NUMBER | 075-123-4567 | NO |
| SENDER NAME | ABC INSURANCE COMPANY | YES |
| ⋮ | ⋮ | ⋮ |

| TRANSMISSION SOURCE FACSIMILE NUMBER | DATE AND TIME RECEIVED | PRINT HISTORY |
|---|---|---|
| 06-1234-5678 | 20190723_134523 | PRINTED |
| 03-1234-5678 | 20190726_162641 | NOT PRINTED |
| 075-123-4567 | 20190801_111202 | PRINTED |
| ⋮ | ⋮ | ⋮ |

FIG. 15

| TRANSMISSION SOURCE FACSIMILE NUMBER | DATE AND TIME RECEIVED | DOCUMENT FILE NAME |
|---|---|---|
| 03-1111-2222 | 20190522_150000 | 0311112222_20190522_150000.pdf |
| 03-1234-5678 | 20190521_150011 | 0312345678_20190521_150011.pdf |
| 06-9876-5432 | 20190521_143032 | 0698765432_20190521_143032.pdf |
| 075-123-4567 | 20190517_170041 | 0751234567_20190517_170041.pdf |
| 03-1234-9876 | 20190515_100027 | 0312349876_20190515_100027.pdf |
| ⋮ | ⋮ | ⋮ |

FIG. 17A
| No. | | DATE AND TIME RECEIVED | TRANSMISSION SOURCE |
|---|---|---|---|
| \multicolumn{2}{\|l\|}{RECEIVED FAX LIST} | | |
| NEW | 1 | 2019/5/22 15:00 | FUKUMOTO CONSTRUCTION CO., LTD. |
| | 2 | 2019/5/21 15:00 | 03-1234-5678 |
| | 3 | 2019/5/21 14:30 | 06-9876-5432 |
| | 4 | 2019/5/17 17:00 | REIWA TRADING CO., LTD. |
| | 5 | 2019/5/15 10:00 | HEISEI BANK |
FIG. 17B
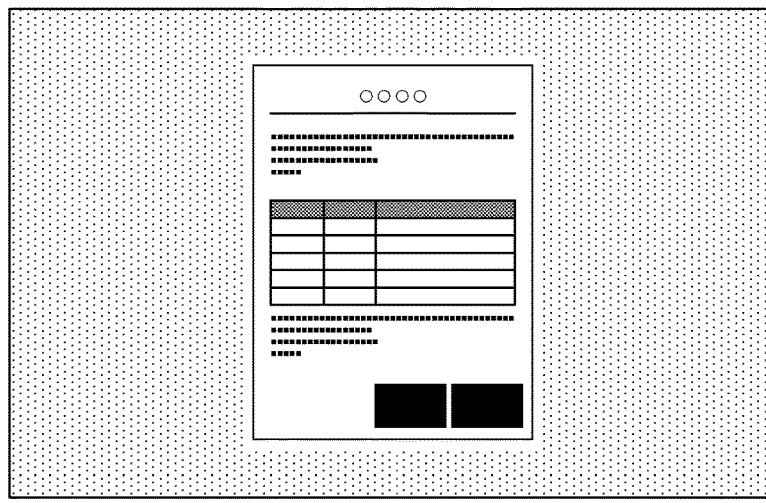
FIG. 17C
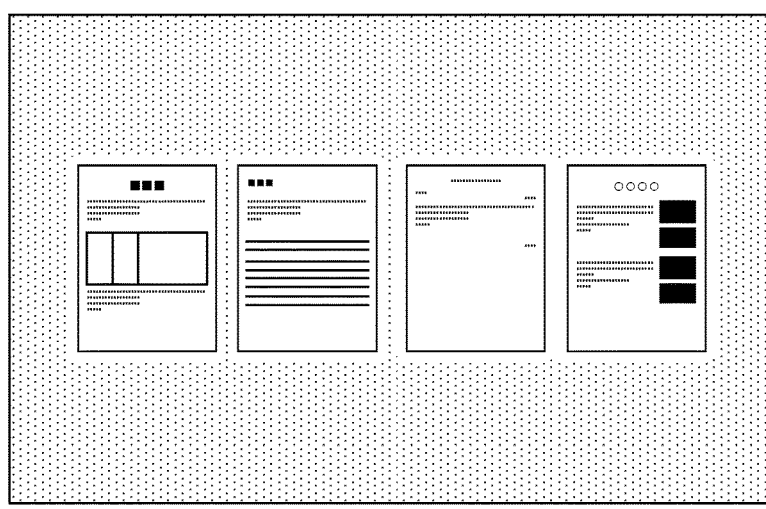

DISPLAY CONTROL DEVICE, DISPLAY CONTROL METHOD, AND DISPLAY SYSTEM

BACKGROUND OF THE INVENTION

Field of the Invention

The present invention relates to a display control device and the like. This Nonprovisional application claims priority under 35 U.S.C. § 119(a) on Patent Application No. 2019-183031 filed in Japan on 3 Oct. 2019, the entire contents of which are hereby incorporated by reference.

Description of the Background Art

In recent years, a mechanism (digital signage) is being used that transmits information in the form of advertisements, sales promotions/space production, various guidance information, and the like, by using an electronic display device such as a display. Furthermore, techniques have been proposed that enable content such as images and videos to be displayed on a display device to be set by a simple operation.

For example, an image forming device has been proposed which has signage storage areas which are associated one-to-one with digital signage devices, and which is capable of transmitting a plurality of image data and setting data stored in the signage storage areas to the digital signage devices (for example, see Japanese Unexamined Patent Application Publication No. 2016-96510).

SUMMARY OF THE INVENTION

Problems to be Solved by the Invention

The technique described in Japanese Unexamined Patent Application Publication No. 2016-96510 is for setting content to be sequentially displayed on a display device. It does not consider the display of additional content provided beyond the sequentially displayed content. Therefore, for example, when a digital signage is used inside an office and content for informing the employees is being sequentially displayed, the technique of Japanese Unexamined Patent Application Publication No. 2016-96510 is unable to realize the display of additional content (such as an image indicating the reception of a facsimile).

The present invention has been made in view of the problems described above, and has an object of providing a display control device and the like that display content on a display device, and display additional content when additional content stored in a prescribed storage area is acquired.

Means for Solving the Problem

In order to solve the problems described above, a display control device according to the present invention includes:
  a storage unit that stores content and a playlist; and
  a controller that displays the content on a display device based on the playlist; wherein
  the controller acquires additional content when additional content is stored in a prescribed storage area, and displays the additional content on the display device.

A display control method according to the present invention includes:
  storing content and a playlist;
  displaying the content on a display device based on the playlist; and
  acquiring additional content when additional content is stored in a prescribed storage area, and displaying the additional content on the display device.

A program according to the present invention causes a computer to realize the functions of:
  storing content and a playlist;
  displaying the content on a display device based on the playlist; and
  acquiring additional content when additional content is stored in a prescribed storage area, and displaying the additional content on the display device.

A display system according to the present invention includes an image forming device, and a display control device that controls the display device, wherein
  the image forming device includes
  a content generator that generates content, and
  a content storage unit that stores the content in a prescribed storage area,
  the display control device includes
  a storage unit that stores content and a playlist, and
  a controller that displays the content on a display device based on the playlist, and
  acquires content when content is stored in the prescribed storage area, and displays the acquired content on the display device.

Effects of the Invention

According to the present invention, it is possible to display content on a display device, and to display additional content when additional content stored in a prescribed storage area is acquired.

BRIEF DESCRIPTION OF THE DRAWINGS

FIG. 4 is a diagram for describing a data configuration of a playlist according to the first embodiment.

FIG. 7 is a flow diagram showing the flow of program information change processing according to the first embodiment.

FIG. 12 is a diagram for describing a data configuration of display restriction information according to a third embodiment.

FIG. 14 is a diagram for describing a data configuration of print history information according to a fourth embodiment.

FIG. 15 is a diagram for describing a data configuration of reception history information according to a fifth embodiment.

FIGS. 17A to 17C are diagrams showing an operation example according to the fifth embodiment.

DESCRIPTION OF THE PREFERRED EMBODIMENTS

Hereunder, embodiments of the present invention will be described with reference to the drawings. In the present embodiment, a display system including a display control device according to the present invention will be described as an example.

1. First Embodiment 1.1 Overall Configuration

Figure 1:
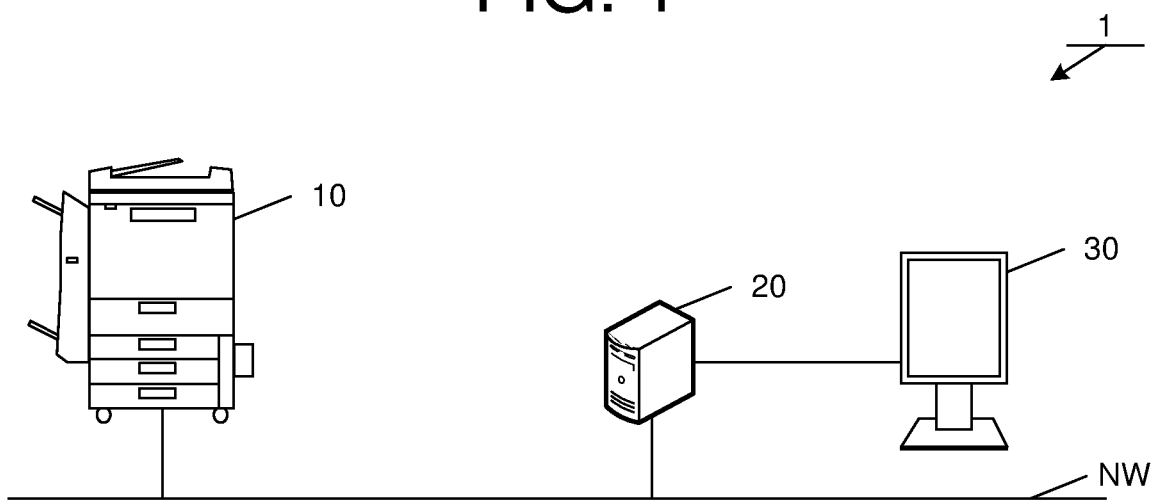
FIG. 1 is a diagram for describing an overall configuration of a display system according to a first embodiment.

FIG. 1 is a diagram for describing the display system 1 as a whole. In the display system 1, an image forming device 10 and a display control device 20 are connected via a network NW. Furthermore, a display device 30 is connected to the display control device 20. The network NW is assumed to be a LAN (Local Area Network). However, for example, it may also represent the Internet.

The image forming device 10 is a digital multifunctional peripheral that realizes a copy function, a print function, a scanner function, a facsimile transmission/reception function, and the like.

The display control device 20 is an information processing device that controls the display of information such as images, video, and text on the display device 30. The display control device 20 is configured, for example by a PC (Personal Computer).

In the present embodiment, the information displayed on the display device 30 under the control of the display control device 20 is referred to as content. Furthermore, the content is displayed on the display device 30 by the display control device 20 according to a playlist that defines the order in which the content is displayed, and the time in which the content is displayed. Note that, in the present embodiment, the information containing the content and the playlist is referred to as program information.

The program information is prepared, for example, by a content provider, an information provider, or an advertisement distributor (hereinafter referred to as a content provider or the like). The display control device 20 acquires the program information, for example, from a device that distributes the program information, or from a storage device connected to the display control device 20. If there is no content to be displayed in advance, program information does not have to be stored in the display control device 20.

The display device 30 is a display device which is capable of displaying content under the control of the display control device 20, and is, for example, a large-scale display device used for a digital signage. The display device 30 is configured by a device including, for example, an LCD (Liquid Crystal Display), an organic EL (electro-luminescence), or an LED (Light Emitting Diode) screen.

Note that, in the present embodiment, the description assumes that the display control device 20 and the display device 30 are configured by separate devices. However, the display control device 20 and the display device 30 may be configured as a single device by installing (integrating) a board having the functions of the display control device 20 in the display device 30.

1.2 Functional Configuration 1.2.1 Image Forming Device

Figure 2:
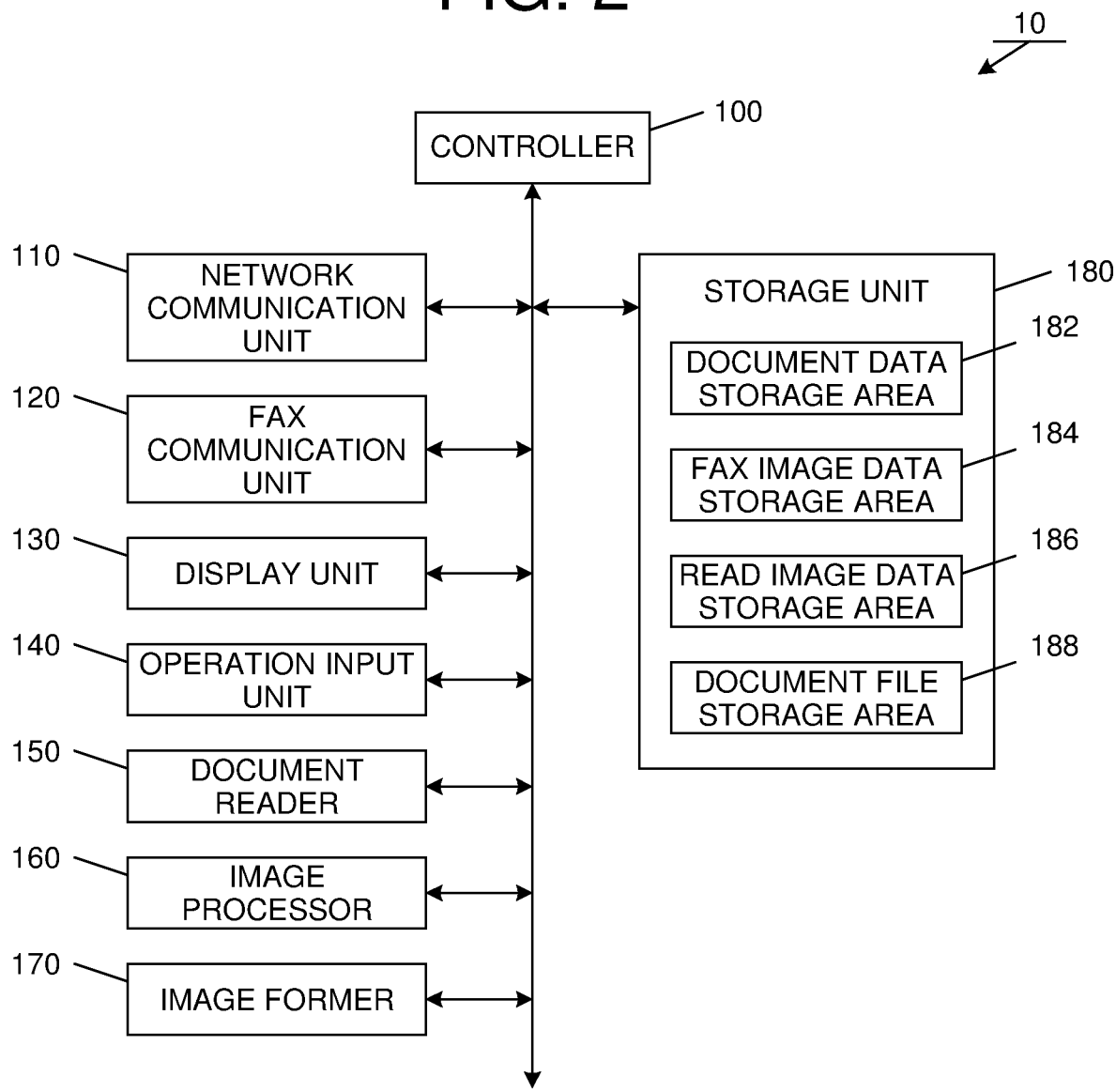
FIG. 2 is a diagram for describing a functional configuration of an image forming device according to the first embodiment.

A functional configuration of the image forming device 10 of the present embodiment will be described with reference to the drawings. As shown in FIG. 2, the image forming device 10 includes a controller 100, a network communication unit 110, a FAX communication unit 120, a display unit 130, an operation input unit 140, a document reader 150, an image processor 160, an image former 170, and a storage unit 180.

The controller 100 is a functional unit for controlling the image forming device 10 as a whole. The controller 100 is configured by one or more arithmetic units (CPUs (Central Processing Units)) and the like, and realizes various functions by reading and executing various programs.

The network communication unit 110 is a functional unit that performs communication by connecting to other devices such as the display control device 20 via the network NW. The network communication unit 110 is, for example, configured by a communicable interface, and the connection method is realized by a wired and/or wireless connection.

The FAX communication unit 120 is a functional unit that transmits/receives images with respect to other devices by connecting to a telephone line such as an analog line or a digital line (ISDN) and performing facsimile communication using a normal G3/G4 standard, or performing facsimile communication using an Internet FAX. Note that, in the present embodiment, a FAX reception refers to the image forming device 10 using facsimile communication to receive an image transmitted according to a standard. Facsimile communication is a type of electric communication that transmits/receives images including text and figures.

The display unit 130 is a functional unit for displaying various information to the user, and is constituted by, for example, an LCD or an organic EL display. Furthermore, the operation input unit 140 is a functional unit for accepting operation instructions from the user, and is configured by hard keys (such as a numeric keypad) or buttons or the like. The image forming device 10 may include a touch panel, in which the display unit 130 and the operation input unit 140 are integrally formed. The method of detecting inputs to the touch panel may be a general detection method such as a resistance film method, an infrared method, an electromagnetic induction method, or a capacitance method.

The document reader 150 is a functional unit that reads an image and generates image data. For example, the document reader 150 is configured by a scanner device or the like that converts an image into an electric signal by means of an image sensor such as a CCD (Charged Coupled Device) or a CIS (Contact Image Sensor), and then generates digital data by quantizing and encoding the electric signal.

The image processor 160 is a functional unit that performs various image processing with respect to the image data. For example, the image processor 160 performs sharpening processing and color conversion processing with respect to the image data.

The image former 170 is a functional unit that forms an image on a recording medium (such as recording paper) based on image data. The image former 170 is constituted by, for example, a laser printer using an electrophotographic method.

The storage unit 180 is a functional unit that stores various programs and various data required for operation of the image forming device 10. The storage unit 180 is constituted by, for example, a semiconductor memory such as an SSD (Solid State Drive) or HDD (Hard Disk Drive).

In the present embodiment, the storage unit 180 secures a document data storage area 182, a FAX image data storage area 184, a read data storage area 186, and a document file storage area 188.

The document data storage area 182 is an area that stores document data received from other devices (such as a terminal device used by the user) via the network communication unit 110. The document data is, for example, image data or data entered in a PDL (Page Description Language).

The FAX image data storage area 184 is an area that stores image data of images received via the FAX communication unit 120 (hereinafter referred to as FAX image data).

The read data storage area 186 is an area that stores image data (read data) generated by the document reader 150.

The document file storage area 188 is an area that stores document files containing image data generated based on document data, FAX image data, and read data. That is to say, the document files are files containing the image data generated (processed) by the image forming device 10 based on the data received by the image forming device 10. In the present embodiment, the document files are described as files (content) which are in a format that can be processed by devices other than the image forming device 10, such as PDF format files. The document files may be files representing image data.

1.2.2 Display Control Device

Figure 3:
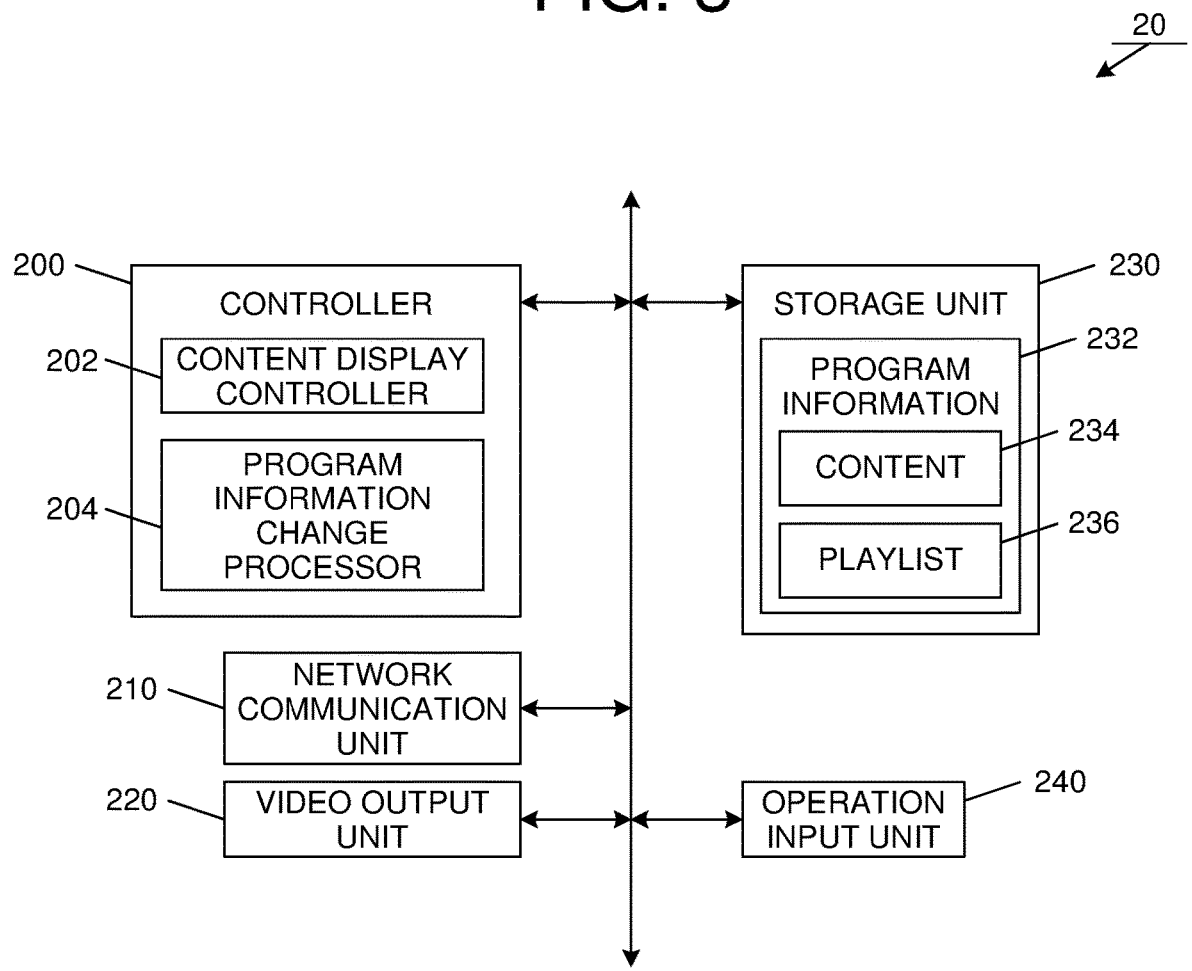
FIG. 3 is a diagram for describing a functional configuration of a display control device according to the first embodiment.

Next, a functional configuration of the display control device 20 will be described with reference to the drawings. As shown in FIG. 3, the display control device 20 includes a controller 200, a network communication unit 210, a video output unit 220, a storage unit 230, and an operation input unit 240.

The controller 200 is a functional unit for controlling the display control device 20 as a whole. The controller 200 is configured by one or more arithmetic units (CPUs) and the like, and realizes various functions by reading and executing various programs.

The network communication unit 210 is a functional unit that performs communication by connecting to the image forming device 10 and other devices, such as devices that distribute program information, via the network NW. The network communication unit 210 is, for example, configured by a communicable interface, and the connection method is realized by a wired and/or wireless connection.

The video output unit 220 is a functional unit that outputs a video signal. The video output unit 220 is, for example, configured as a terminal, and is connected by any method such as HDMI, DisplayPort, or USB (Universal Serial Bus) Type C.

The storage unit 230 is a functional unit that stores various programs and various data required for operation of the display control device 20. The storage unit 230 is constituted by, for example, a semiconductor memory such as an SSD or HDD.

The storage unit 230 stores program information 232. Furthermore, the program information 232 includes content 234 and a playlist 236.

The content 234 is the specific data such as images, video and text displayed on the display device 30, and are files such as image files, video files, and text files. Moreover, one or more pieces of content 234 may be included in a single piece of program information. In the present embodiment, the content 234 is described as being files which are specified by a file name.

The playlist 236 defines the display order and the display time of the content 234. For example, as shown in FIG. 4, the playlist 236 is table data which associates the file name of the content 234 (such as "travel_expense_application.jpg") with a display time (such as "00:00:10"). The example of FIG. 4 indicates that images based on the three files "travel_expense_application.jpg", "recycling_activities.jpg", and "energy_saving_promotion.jpg" are each displayed for 10 seconds.

Note that one or more playlists 236 may be included in a single piece of program information. Furthermore, an area of the display unit 320 (a display frame) may be set for each playlist 236 which displays the content defined in the playlist 236.

The operation input unit 240 is a functional unit for accepting operation instructions from the user. The operation input unit 240 is configured by, for example, buttons provided on the display control device 20, or a remote control device that enables wireless operations.

The controller 200 also functions as a content display controller 202 and a program information change processor 204.

The content display controller 202 reads the program information 232, generates a video signal for displaying the content 234 according to the playlist 236, and performs a control that outputs the video signal via the video output unit 220.

Specifically, the content display controller 202 reads from the playlist 236 the file name and the display time which are first in the display order. Then, the content display controller 202 generates a video signal that displays the content 234 corresponding to the file name for the time indicated by the display time, and outputs the video signal via the video output unit 220. When the time indicated by the display time elapses, the content display controller 202 reads the file name and the display time which are next in the display order, generates a video signal that displays the content 234 corresponding to the file name for the time indicated in the display time, and outputs the video signal via the video output unit 220. The content display controller 202 repeats the processing above until the file name and the display time which are last in the display order are read from the playlist 236.

Furthermore, after reading the file name and the display time which are last in the display order, the content display controller 202 reads the file name and the display time which are first in the display order again. As a result, the content display controller 202 is capable of performing a control that repeatedly displays the content 234 according to the order defined by the playlist 236.

If a plurality of playlists 236 are included in the program information 232, the content display controller 202 performs the processing described above for each playlist 236, and generates a video signal that simultaneously displays a plurality of content. Furthermore, if a display frame is set for each playlist 236, the content display controller 202 generates a video signal such that images of the content are displayed in the areas set as display frames.

Moreover, a plurality of pieces of program information 232 may be stored in the storage unit 230. In addition, timetable information that defines the time period in which the program information 232 is read by the content display controller 202 may be stored in the storage unit 230. In this case, the content display controller 202 reads the program information 232 according to the timetable, and performs a control that displays the content 234 according to the playlist 236 included in the read program information 232.

If there is no content 234 to display because program information 232 is not stored in the storage unit 230 or information is not stored in the playlist 236, the content display controller 202 may, for example, perform a control that displays a prescribed color or pattern on the display device 30.

The program information change processor 204 executes program information change processing, which is processing that adds or removes the content 234 included in the program information 232, and changes the entries in the playlist 236. The program information change processing will be described later.

1.2.3 Display Device

Figure 5:
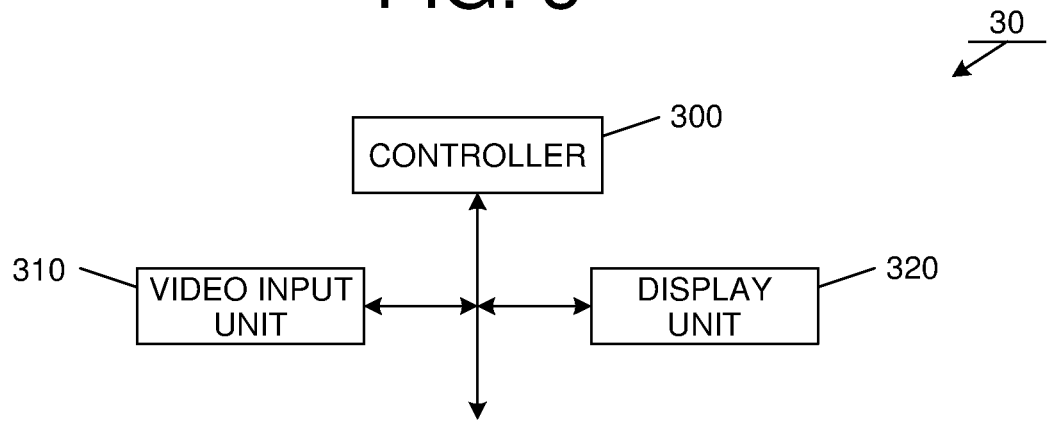
FIG. 5 is a diagram for describing a functional configuration of a display device according to the first embodiment.

Next, a functional configuration of the display device 30 will be described with reference to the drawings. As shown in FIG. 5, the display device 30 includes a controller 300, a video input unit 310, and a display unit 320.

The controller 300 is a functional unit for controlling the display device 30 as a whole. The controller 300 is configured by one or more arithmetic units (CPUs) and the like, and realizes various functions by reading and executing various programs.

The video input unit 310 is a functional unit that receives a video signal to be displayed on the display unit 320. The video input unit 310 is, for example, configured as a terminal, and is connected by any method such as HDMI, DisplayPort, or USB (Universal Serial Bus) Type C. Furthermore, in the present embodiment, the video input unit 310 is connected to the video output unit 220 of the display control device 20, and receives the video signal output from the video output unit 220.

The display unit 320 is a functional unit that displays an image based on a video signal input from the video input unit 310. The display unit 320 is configured by, for example, a display device such as an LCD, an organic EL display, or an LED screen, or an irradiation device such as a projector. The display unit 320 may also be an irradiation device such as a projector.

1.3 Processing Flow 1.3.1 Main Processing of Image Forming Device

Figure 6:
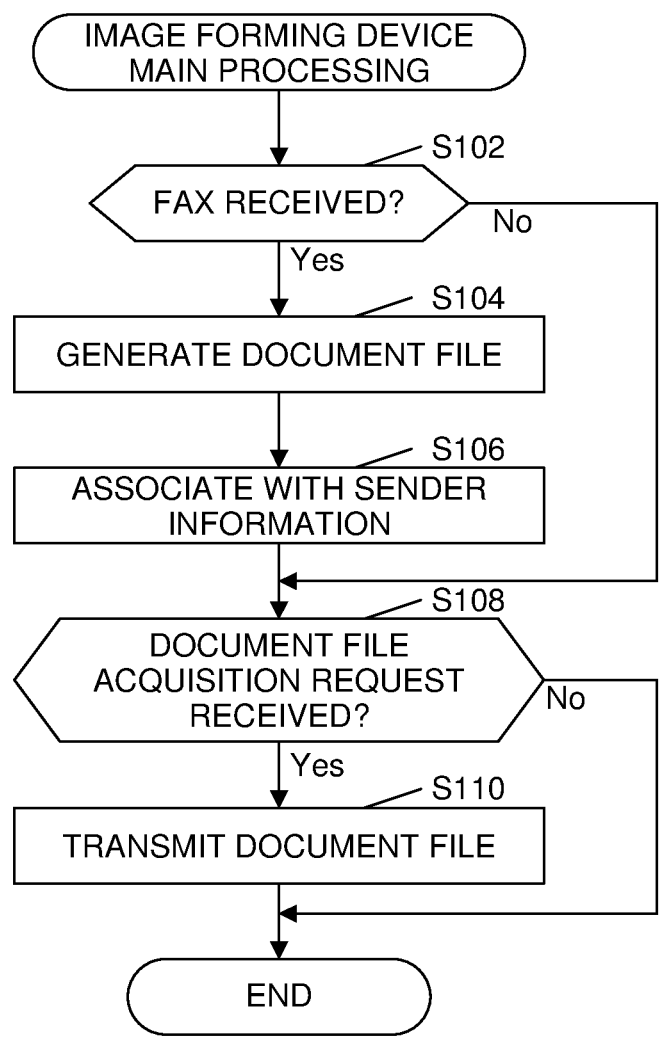
FIG. 6 is a flow diagram showing the flow of main processing of the image forming device according to the first embodiment.

The main processing executed as a result of the controller 100 of the image forming device 10 reading a program from the storage unit 180 will be described with reference to FIG. 6.

Firstly, the controller 100 determines whether or not a FAX has been received (step S102). If a FAX has been received, the controller 100 stores FAX image data in the FAX image data storage area 184.

Then, the controller 100 generates a document file based on the image data of the image received in step S102 (step S104). For example, the controller 100 generates a PDF file in which the image data is divided into pages each having the size of the recording paper (for example, A4). Furthermore, the controller 100 stores the generated document file in the document file storage area 188.

Then, the controller 100 associates the document file generated in step S104 with sender information (step S106). Note that the association of the document file and the sender information refers to a state in which the sender information associated with a document file can be acquired by a device or program handling the document file.

The sender information is information that enables the person that transmitted the image based on a standard using facsimile communication to be identified, and is, for example, a facsimile number, a sender name, an email address, or an IP address of the facsimile device (transmission source) used by the sender. For example, in a case where facsimile communication based on the G3 standard is used, the controller 100 may use as the sender information the TSI (Transmitting Subscriber Identification) itself, which is information that identifies the transmission terminal, or a portion of the information included in the TSI.

For example, if a facsimile number is included in the TSI, the controller 100 may extract the facsimile number and use it as the sender information. Furthermore, in a case where information associated with the information included in the TSI is stored in the storage unit 180 in a so-called address book, the controller 100 may use the information associated with the information included in the TSI as the sender information.

Moreover, when associating the document file and the sender information, the controller 100 includes, for example, the sender information as part of the file name of the document file. By doing so, the devices and programs that handle the document file are capable of extracting the sender information from the file name of the document file. In this case, the controller 100 generates a document file having an arbitrary name and stores the file in the document file storage area 188 in step S104, and then changes the file name in step S106. In a case where the sender information is associated using the file name, the controller 100 may generate the sender information in advance, and then assign a file name that includes the generated sender information when generating the document file.

The association of the document file and the sender information may, for example, be performed by a method which includes the sender information as an attribute of the document file, or may be a method that stores the sender information in a file having the same file name as the document file, but having a different extension.

Furthermore, the sender information may be configured by a plurality of pieces of information. For example, a sender name and a facsimile number of the transmission source may be included as the sender information. In this case, for example, an entry for the sender facsimile number, and an entry for the sender name are included as attributes of the document file.

Next, the controller 100 determines whether or not a document file acquisition request, which represents a request to acquire a document file, has been received from the display control device 20 (step S108). If a document file acquisition request has been received, the controller 100 transmits the document file stored in the document file storage area 188 to the display control device 20 that transmitted the document file acquisition request (step S108; Yes→step S110).

If a document file is not stored in the document file storage area 188, the controller 100 may transmit information indicating that a document file is not stored to the display control device 20.

Furthermore, the controller 100 may delete the document file from the document file storage area 188 at a prescribed timing. For example, the controller 100 may, at the point the image received in step S102 is formed in the image former 170, delete the associated document file, or may delete the document file transmitted to the display control device 20 after the transmission in step S110. As a result, the controller 100 is capable of avoiding the repeated transmission of the same document file to the display control device 20.

1.3.2 Program Information Change Processing

The program information change processing executed by the program information change processor 204 of the display control device 20 will be described with reference to FIG. 7. The program information change processor 204 executes the program information change processing, for example, at regular intervals (such as every 5 minutes).

Firstly, the program information change processor 204 transmits a document file acquisition request to the image forming device 10 (step S132).

If a document file is acquired as a result of the image forming device 10 transmitting the document file in response to transmission of the document file acquisition request, the program information change processor 204 generates a document image from the acquired document file. Then, the program information change processor 204 stores the generated document image as the content 234 of the program information 232 that has been read by the content display controller 202 (step S134; Yes→step S136). As a result, an image file representing the image generated from the document file is newly stored in the program information 232.

A document image is an image generated based on a document file. For example, if the document file is a PDF file, an image of the first page of the PDF file is used as the document image. Furthermore, the document image may include an image of text representing the sender information (for example, the facsimile number or the sender name). Note that the program information change processor 204 may use an image obtained by combining images of a plurality of pages as the document image. Moreover, if the document file is an image file, the acquired image file may be used as the document image.

Next, the program information change processor 204 adds the file name and the display time of the document image file stored in step S136 to the playlist 236 included in the program information 232 that has been read by the content display controller 202 (step S138). Furthermore, the location that the items are added is, for example, the head of the playlist 236. As a result, it becomes possible to display the newest document image on the display device 30 first. The location that the items are added and the display time may be determined in advance, or may be set by a content provider or an administrator of the display system 1 or the like.

In this manner, the program information change processor 204 is capable of incorporating (adding) a document image based on a document file to the program information 232 that has been read by the content display controller 202. Furthermore, after incorporation of the document image, the program information is subjected to a display control by the content display controller 202, and the document is displayed on the display device 30.

If the program information change processor 204 receives a plurality of document files, it may add the files to the playlist 236 based on date and time information associated with the document file (for example, the reception date and time or the date and time the document file was created). For example, the program information change processor 204 adds, from the head of the playlist 236, the file names of the document images associated with the document files in order from the document file having the newest date and time.

Furthermore, if program information 232 has not been read by the content display controller 202 because program information 232 is not stored in the storage unit 230, the program information change processor 204 stores program information 232 in the storage unit 230 prior to the processing of step S136. Then, the program information change processor 204 stores the content 234 in the stored program information 232 in step S136, and newly generates and stores a playlist 236 containing the file name and display time of the document image file in step S138. As a result of the processing above, the newly stored program information 232 is read by the content display controller 202, and the document image is displayed on the display device 30.

Next, the program information change processor 204 determines whether or not the document image stored in step S136 has been displayed on the display device 30 (step S140). The determination of whether or not the document image has been displayed on the display device 30 is made, for example, by the program information change processor 204 monitoring the content 234 that the content display controller 202 has controlled so as to be displayed on the display device 30. It is also possible for the content display controller 202 to manage display history information, which associates the content 234 with a flag that indicates whether or not a control has been performed to display the content 234, and for the program information change processor 204 to make a document image determination based on the display history information. In this case, the program information change processor 204 may periodically read the display history information, and determine whether or not the document image stored in step S136 has been displayed based on the flag information associated with the content 234 stored in step S136.

If the document image is determined to have been displayed, the controller 100 deletes the document image file stored in step S136 (step S140; Yes→step S142).

Furthermore, among the file name and display time information added in step S138, the controller 100 deletes from the playlist 236 the information relating to the file name of the document image deleted in step S142, and the display time associated with the file name (step S144).

1.4 Operation Example

Figures 8A, 8B, 8C:
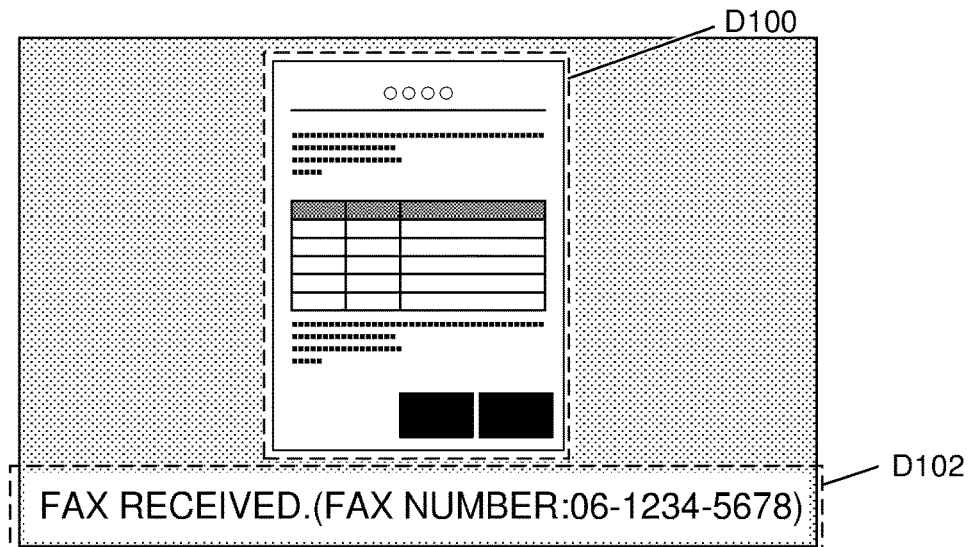
FIGS. 8A to 8C are diagrams showing an operation example according to the first embodiment.

An operation example of the present embodiment will be described with reference to FIGS. 8A to 8C. FIG. 8A is a diagram showing an example of a playlist 236 that contains program information provided by a content provider or the like. FIG. 8B is a diagram showing an example of a playlist 236 that, as a result of the program information change processing being executed by the program information change processor 204, has the file names and display times of two document images (C100 and C102) added as shown in E100. The content display controller 202 performs a control that displays the document image indicated by C100 and the document image indicated by C102 on the display device 30 according to the playlist 236 shown in FIG. 8B. As a result, as shown in FIG. 8C, the document images of the document files generated based on the FAX image data are displayed on the display device 30. The document images displayed on the display device 30 include, for example, as shown in FIG. 8C, an image D100 of the first page of a PDF file representing the document file, and sender information D102.

Furthermore, when the document image indicated by C100 and the document image indicated by C102 are displayed on the display device 30, the program information change processor 204 deletes the document images and deletes the entries added to the playlist 236. As a result, the playlist is returned from the playlist 236 shown in FIG. 8B to the playlist 236 shown in FIG. 8A. That is to say, after the document images have been displayed, the display control device 20 controls the display based on the program information prior to the additions to the playlist.

In the embodiment described above, the description assumed that the display control device 20 transmits a document file acquisition request to the image forming device 10, and the document file is acquired from the image forming device 10. However, the embodiment is not limited to such processing. For example, the display control device 20 may firstly query the image forming device 10 as to whether or not a document file is stored, and acquire the document file when information indicating that a document file is stored is received from the image forming device 10. Furthermore, the display control device 20 may refer to the storage unit 180 of the image forming device 10, and acquire a stored document file when a document file is stored in the storage unit 180.

Moreover, in the embodiment described above, the description assumed that the image forming device 10 generates a document file based on image data of a FAX image. However, a document file based on document data or read data may be generated. As a result, the display control device 20 is capable of performing a display control with respect to the display device 30 using an image of a document read by the image forming device 10, or an image of document data transmitted from a terminal device or the like. In this case, the controller 100 may be capable of discriminating whether the document file has been generated based on FAX image data, generated based on document data, or generated based on read data. For example, the controller 100 may be capable of making the discrimination based on the file name of the document file. It may also be capable of making the discrimination by the inclusion of an attribute indicating the type of data on which the creation of the document file was based. In addition, the image forming device 10 may enable other devices to determine that a document file was generated by the image forming device 10. For example, the image forming device 10 may include only image data in the document file, use a format for the data included in the document file which is unique to the image forming device 10, or include attribute information in the document file which indicates that it was generated by the image forming device 10. The display control device 20 determines whether or not the document file acquired from the image forming device 10 was a document file generated by the image forming device 10, and only displays the document file if it was generated by the image forming device 10. As a result, the display control device 20 is capable of only displaying document images of document files generated by the image forming device 10, and can avoid displaying document images based on PDF files and the like stored by a third party on the display device 30.

In addition, in the embodiment described above, the description assumed that the document file is stored in a document file storage area 188 provided in the storage unit 180 of the image forming device 10. However, the area that stores the document file does not have to be provided in the storage unit 180. For example, the image forming device 10 may connect to a NAS (Network Attached Storage) via the network NW, and store the document file in a prescribed storage area provided in the NAS. In this case, the display control device 20 may periodically perform a query (polling) to determine whether or not a document file is being periodically stored in the NAS, and acquire the document file from the NAS if a document file is stored. The storage unit 180 may also be used as a NAS.

Furthermore, in the embodiment described above, because the program information change processor 204 deletes a document image after being displayed on the display device 30, if the same document file is acquired multiple times, the processing that generates the document image is executed each time. In order to reduce such processing, the program information change processor 204 may compare the document files corresponding to the content 234 with the document file acquired from the image forming device 10. In this case, the program information change processor 204 stores the document image of the document file as content 234 if it is newly acquired, and adds it to the playlist 236. On the other hand, if the program information change processor 204 is unable to acquire a document file associated with a document image that is being displayed, it deletes the content 234 associated with the document image, and also deletes it from the playlist 236. As a result, the program information change processor 204 is capable of realizing the same functions as the functions realized by the processing shown in FIG. 6.

According to the present embodiment, the display control device acquires a document file based on FAX image data or the like in addition to program information (public content) prepared in advance, and performs a control that displays the document image on a large-scale display device or the like used for digital signage. The display control device displays, via a display device, information to various people in the surroundings of the display device. Therefore, by displaying the document image on the display device, it is possible to notify the people in the surroundings that a FAX has been received. Furthermore, by displaying a document image based on a document file, it is possible for each person in the surroundings of the display device to confirm whether or not information that they require has been received. In addition, the risk of missing the reception of a FAX can be reduced.

2. Second Embodiment

Next, a second embodiment will be described. Unlike the first embodiment, the second embodiment is an embodiment in which the display control device 20 displays a document image such that it is overlaid on the content displayed based on the program information. The present embodiment replaces FIG. 3 of the first embodiment with FIG. 9. In addition, the same reference numerals are given to the same functional units and processing, and the description will be omitted.

Figure 9:
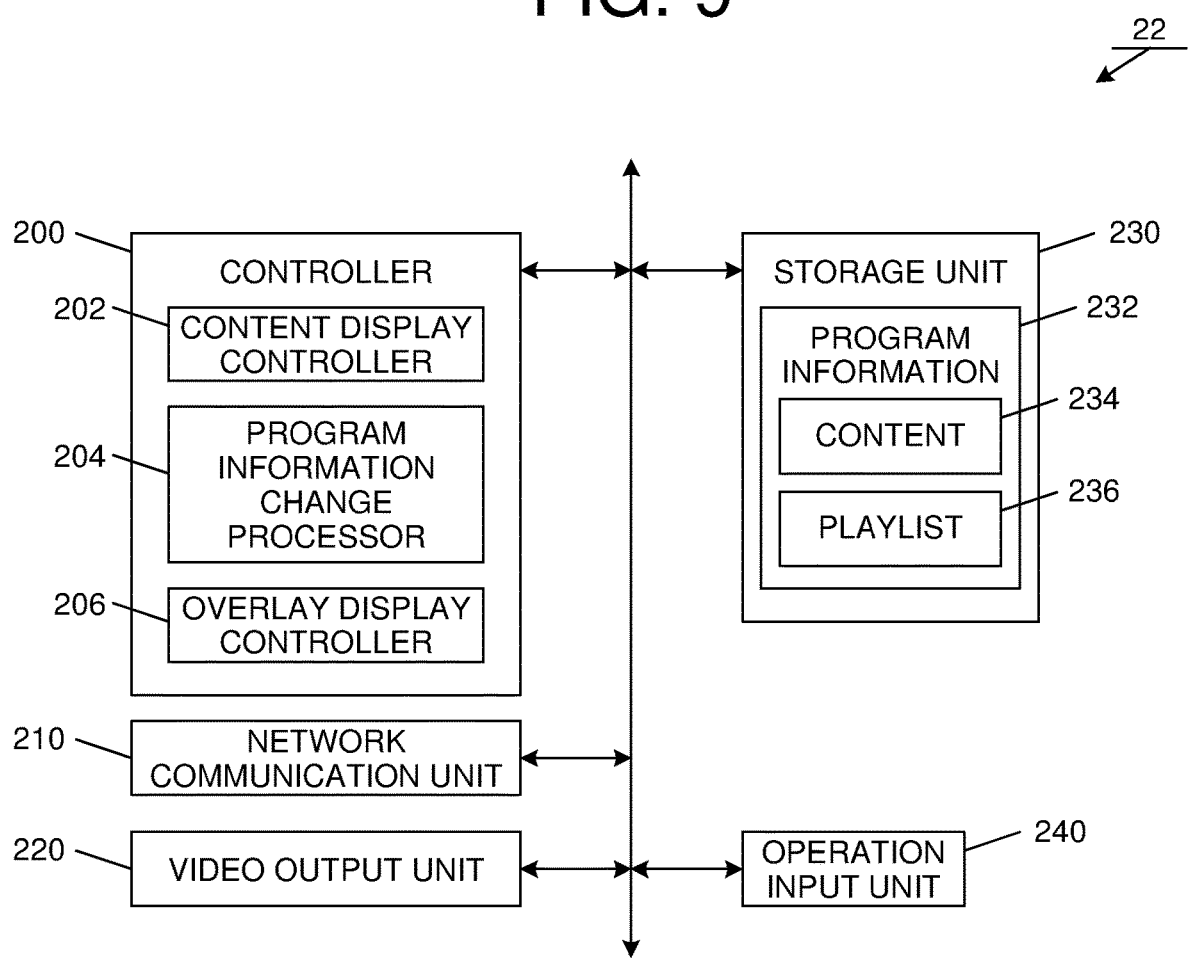
FIG. 9 is a diagram for describing a functional configuration of a display control device according to a second embodiment.

The functional configuration of the display control device 22 of the present embodiment will be described with reference to the drawings. As shown in FIG. 9, unlike the display control device 20, the controller 200 of the display control device 22 further includes an overlay display controller 206.

Figure 10:
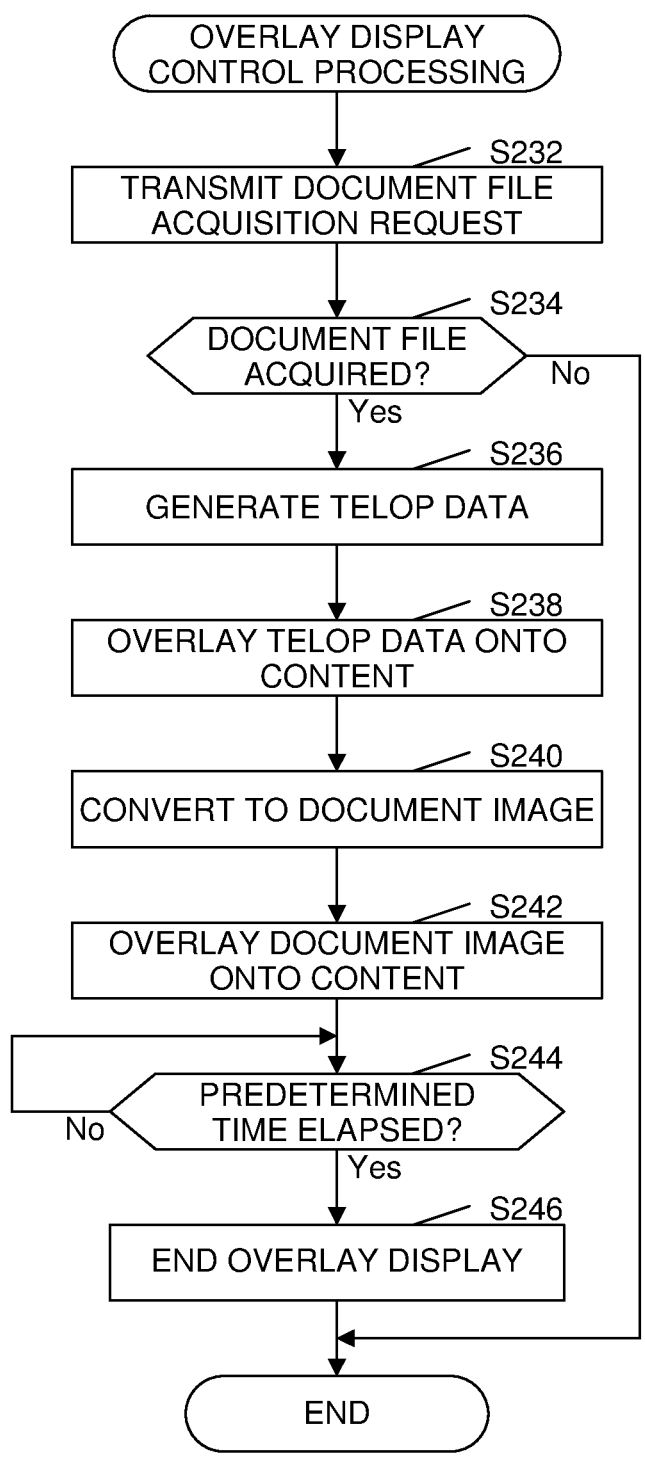
FIG. 10 is a flow diagram showing the flow of overlay display control processing according to the second embodiment.

The overlay display controller 206 performs processing (overlay display control processing) that controls the display such that a document image is overlaid on the content displayed by the content display controller 202. The overlay display control processing will be described with reference to FIG. 10.

Firstly, the overlay display controller 206 transmits a document file acquisition request to the image forming device 10 (step S232).

If a document file is acquired from the image forming device 10, the overlay display controller 206 generates telop data from the acquired document file (step S234; Yes→step S236). The telop data is text data which is displayed on the display device 30, and, for example, is text data representing sender information.

Next, the overlay display controller 206 performs a control that displays (in an overlay display) the telop data generated in step S236 so that it is overlaid on the content displayed by the content display controller 202 (step S238). In terms of the method of generating the overlay display, for example, the overlay display controller 206 may combine the telop data with a video signal output from the content display controller 202, and output the combined signal to the video output unit 220. In this case, the content display controller 202 may output the video signal to the overlay display controller 206 instead of the video output unit 220.

Next, the overlay display controller 206 converts the acquired document file into a document image, and performs a control that displays the document overlaid on the content displayed by the content display controller 202 (step S240→step S242). The control method that generates displays the document image overlaid on the content may be the same method as step S238.

Furthermore, after displaying an overlay display of the telop data and the document image in step S238 and step S242, the overlay display controller 206 ends the overlay display when a prescribed time has elapsed (step S244; Yes→step S246). The prescribed time, which is the duration that the overlay display is displayed, may be determined in advance, or may be set by a content provider or an administrator of the display system 1 or the like.

Figure 11:
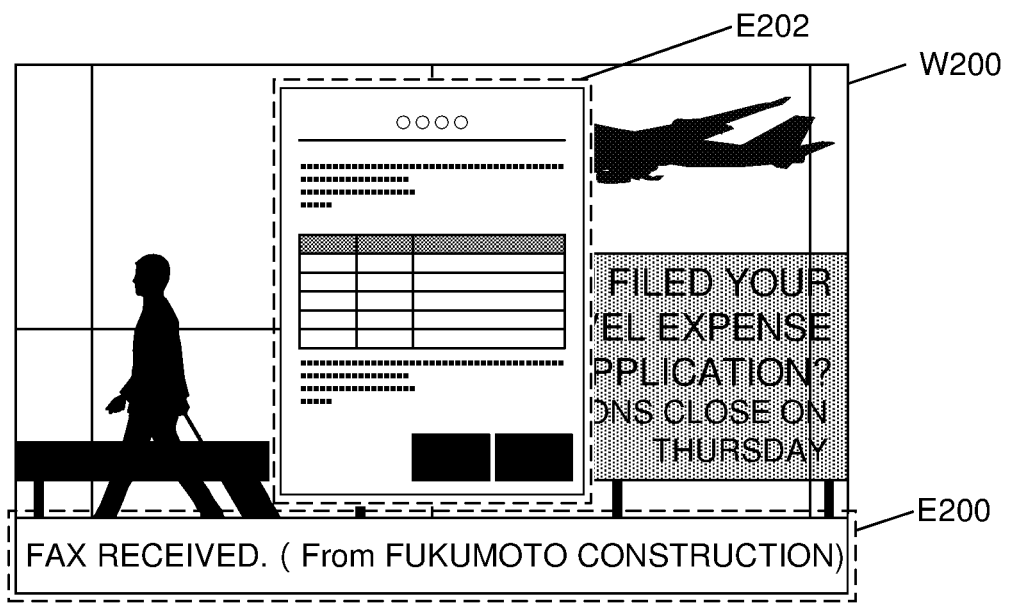
FIG. 11 is a diagram showing an operation example according to the second embodiment.

An operation example of the present embodiment is shown in FIG. 11. FIG. 11 is a diagram showing a display screen W200 on the display unit 320 of the display device 30, and is showing a case where a control is performed by the display control device 20 that displays content 234 in the entire display area.

Here, the telop data E200 and the document image E202 are displayed overlaid on the content 234 included in the program information 232 by the overlay display controller 206.

In the embodiment described above, the description assumed that the overlay display controller 206 combines telop data and document images with a video signal. However, an overlay display may be realized using a plurality of playlists 236.

Specifically, the program information 232 stores a playlist 236 for displaying telop data and document images in addition to the playlist 236 that displays the content provided by a content provider or the like. Furthermore, a display frame is set for each playlist so that the telop data and document images are displayed overlaid on the content prepared by the content provider or the like.

In this case, the playlist 236 does not define a display order of the telop data and document images in the original state. That is to say, it is an empty playlist. Then, the overlay display controller 206 stores the telop data and document images as content 234 when the timing arrives to display the telop data and document images. In addition, the file names and display times of the telop data and document images are added to the playlist 236 so that the telop data and document images of the stored content 234 are displayed. In this manner, the telop data and document images are displayed by the content display controller 202.

According to the present embodiment, when the display control device acquires a document file, it performs a control that generates an overlay on the content based on the program information, and then displays the document image. Consequently, compared to a case where the document image is displayed based on the playlist, the time from the acquisition of the document image to being displayed can be shortened.

3. Third Embodiment

Next, a third embodiment will be described. The third embodiment is an embodiment in which the display control device 20 determines whether or not to display a document image of a document file based on sender information associated with the document file.

The present embodiment can be applied to both the first and second embodiments. However, a case where it is applied to the first embodiment will be described. In this case, FIG. 7 of the first embodiment is replaced with FIG. 13. In addition, the same reference numerals are given to the same functional units and processing, and the description will be omitted.

In the present embodiment, the storage unit 230 of the display control device 20 stores display restriction information such as that shown in FIG. 12. The display restriction information is information which associates sender information with a display restriction (for example, "yes") which indicates whether or not document images of document files associated with the sender information can be displayed.

The sender information stored in the display restriction information stores information in a form that supports the method of associating document files and sender information. For example, if a document file is associated with sender information by including information about the sender name and the sender facsimile number in the document file, then, as shown in FIG. 12, information about the attribute item name and item value is included as the sender information stored in the display restriction information. For example, the example of D300 in FIG. 12 shows that a display restriction exists for document images of document files having an attribute item name of "sender facsimile number" and an attribute value of "06-1234-5678". That is to say, such images are not displayed.

Figure 13:
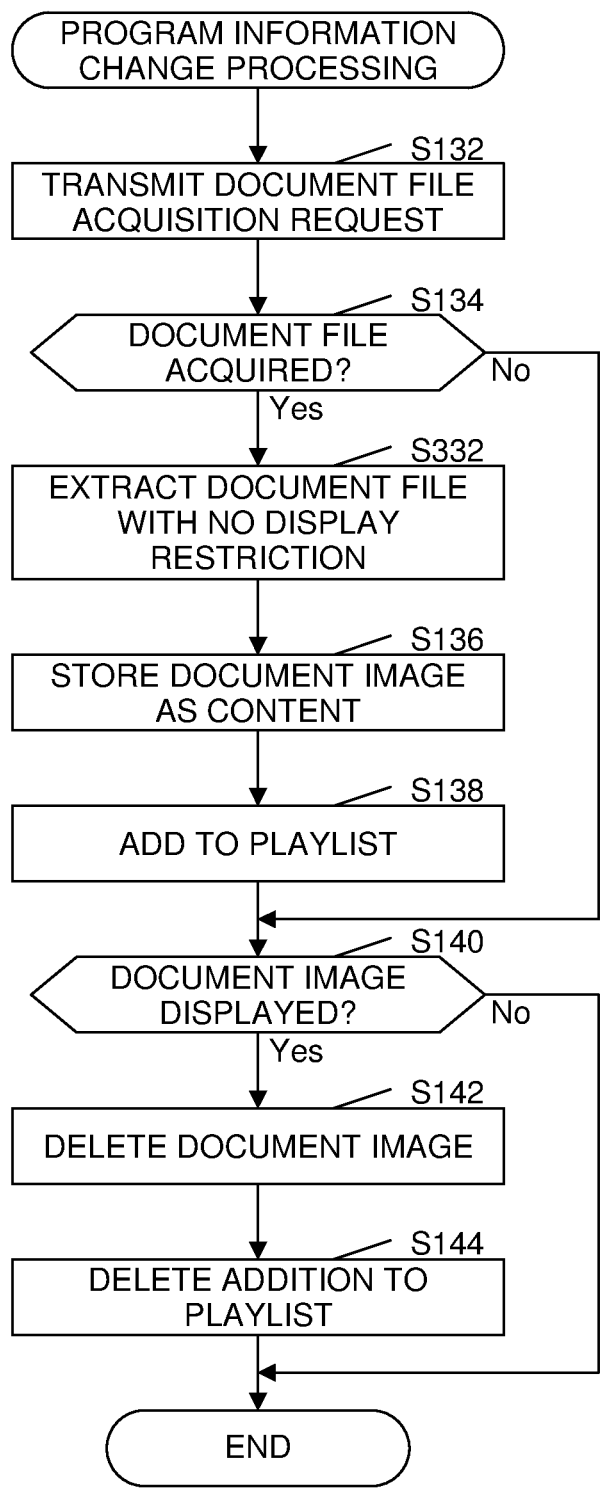
FIG. 13 is a flow diagram showing the flow of program information change processing according to the third embodiment.

The flow of processing performed by the program information change processor 204 according to the present embodiment is shown in FIG. 13. In the present embodiment, upon acquiring document files, the program information change processor 204 extracts the document files that do not have a display restriction (step S134; Yes→step S332). Specifically, the program information change processor 204 acquires the sender information associated with each document file. Then, it reads the display restriction information associated with the acquired sender information, and determines whether or not "no" is stored as the display restriction. That is to say, it determines whether or not the document file is displayable on the display device 30. Then, if the display restriction is "no", the program information change processor 204 extracts the document file.

If display restriction information corresponding to the sender information acquired from the document file has not been stored, the administrator of the display system 1 or the like may set in advance whether or not the document file is displayed. If a setting is in place to display the document file, in step S332, the program information change processor 204 extracts the document file when there is no display restriction information corresponding to the sender information acquired from the document file. If there is no setting in place to display the document file, in step S332, the program information change processor 204 does not extract the document file when there is no display restriction information corresponding to the sender information acquired from the document file.

Furthermore, if document files based on document data and read data are acquired as the document files, the program information change processor 204 may extract all document files based on document data and read data in step S332.

Note that, when the present embodiment is applied to the second embodiment, the overlay display controller 206 may execute, after performing the processing that acquires document files in step S234, processing which extracts a document file with no display restriction in the same manner as step S332.

Furthermore, the present embodiment has been described assuming that the determination of whether or not a document image is displayed is made based on sender information, but this need not be the case. For example, the display control device 20 may determine whether or not to display a document image based on an attribute included in the document image, or may determine whether or not to display a document image by performing text recognition with respect to the document image and determining whether or not prescribed text is included. For example, the display control device 20 may perform a display restriction if the document image includes text such as "confidential".

According to the present embodiment, the display control device is capable of setting whether or not to perform a display restriction based on sender information. Further, based on the setting, it can be determined whether or not the document image can be displayed. In particular, when facsimile communication is used, highly confidential information may be transmitted. In such cases, as a result of the display control device performing a display restriction based on sender information, the display of highly confidential information on the display device can be avoided.

4. Fourth Embodiment

Next, a fourth embodiment will be described. The fourth embodiment is an embodiment that displays a document image of a document file associated with an image that has not been formed (has not been printed) by the image forming device 10.

The present embodiment can be applied to any of the first to third embodiments. However, a case where it is applied to the first embodiment will be described.

In this embodiment, the date and time the FAX image data corresponding to a document file is received via the FAX communication unit 120 can be acquired from the document file of the FAX image data. For example, when the controller 100 of the image forming device 10 generates the document file, it may include the reception date and time in the file name, or include the reception date and time as an attribute of the document file.

Furthermore, in the present embodiment, print history information is stored in the storage unit 230 of the display control device 20. The print history information is information indicating whether or not a document file has been output by printing by the image forming device 10.

The print history information stores, for example, as shown in FIG. 14, information indicating whether or not a facsimile image has been output by printing. As shown in FIG. 14, the print history information includes a sender facsimile number (for example, "06-1234-5678"), which is a type of sender information, a reception date and time (for example, "20190723_134523"), and a print history indicating whether or not printing has been performed (for example, "printed").

Next, the program information change processing performed by the program information change processor 204 in the present embodiment will be described. When the program information change processor 204 executes processing which acquires a document file from the image forming device 10, which is the processing of step S134, it acquires a job log, and stores print history information based on the acquired job log. Specifically, the program information change processor 204 acquires a sender facsimile number and a reception date and time from the acquired document file. Then, if a job that printed the FAX image data specified by the acquired sender facsimile number and reception date and time is included in the job log acquired from the image forming device 10, the program information change processor 204 stores print history information with the print history as "printed". Furthermore, if a job that printed the FAX image data is not included in the job log acquired from the image forming device 10, the print history information is stored with the print history as "not printed".

Next, the display control device 20 reads, for each document file, the print history information associated with the document file, and determines whether or not the print history is "not printed". Then, if the display restriction is "no", the program information change processor 204 extracts the document file. As a result, the program information change processor 204 is capable of extracting the document files which have not been printed from the image forming device 10.

Then, in step S136, the program information change processor 204 generates document images of the document files extracted in step S134.

Note that, when being applied to the second embodiment, the overlay display controller 206 may execute, after performing the processing which acquires document files in step S234, processing which extracts document files in the same manner as step S332 based on the print history information. Furthermore, when being applied to the third embodiment, processing that extracts the document file based on the print history information may be executed before execution of step S332. As a result of applying the third embodiment to the present embodiment, it is possible to display on the display unit 320 the document images of the document files based on FAX image data that has not been printed and does not have a display restriction.

According to the present embodiment, the display control device is capable of only displaying FAX image data that has not already been printed on the display device. Therefore, by viewing the display device, the people in the surroundings of the display device are able to confirm that a FAX has been received, and also that the received image has not been printed.

5. Fifth Embodiment

Next, a fifth embodiment will be described. The fifth embodiment is an embodiment in which the display control device 20 displays an image on the display device 30 based on date information associated with the document file.

Figure 16:
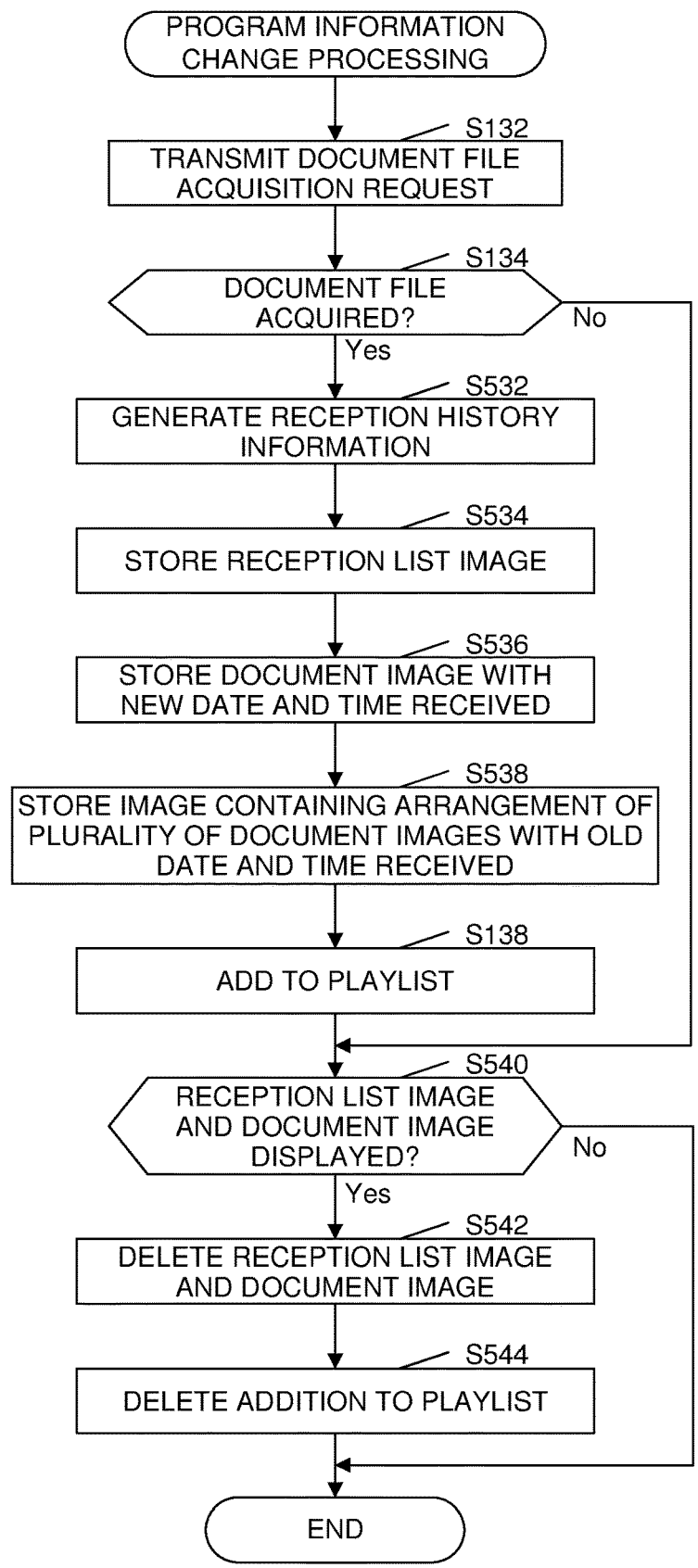
FIG. 16 is a flow diagram showing the flow of program information change processing according to the fifth embodiment.

The present embodiment can be applied to any of the first to fourth embodiments. However, a case where it is applied to the first embodiment will be described. In this case, FIG. 7 of the first embodiment is replaced with FIG. 16. In addition, the same reference numerals are given to the same functional units and processing, and the description will be omitted.

Furthermore, in the present embodiment, like the fourth embodiment, the document file of the FAX image data enables the date and time the FAX image data was received via the FAX communication unit 120 to be acquired.

In the present embodiment, the storage unit 230 of the display control device 20 stores reception history information such as that shown in FIG. 15. The reception history information is information that stores the reception date and time that the FAX image data associated with a document file based on the FAX image data was received. As shown in FIG. 15, the reception history information stores a sender facsimile number (for example, "06-1234-5678"), which is a type of sender information, a reception date and time (for example, "20190723_134523"), and a file name of the document file (for example, "0311112222_20190522_150000.pdf").

The flow of program information change processing performed by the program information change processor 204 according to the present embodiment is shown in FIGS. 17A to 17C. In the present embodiment, reception history information is generated after acquisition of the document files (step S134; Yes→step S532). For example, the program information change processor 204 acquires a reception date and time from the document files acquired in step S134, and generates reception history information.

Then, the program information change processor 204 generates a reception list image, which is an image of a list in which the reception date and time and the sender information are listed in order from the most recent reception date and time, and then stores the reception list image as content 234 (step S534).

Further, the program information change processor 204 generates a document image of a document file having a new reception date and time, and stores the document image as content 234 (step S536). Moreover, the program information change processor 204 generates an image in which a plurality of document images of document files having an old reception date and time are arranged, and stores the image as content 234 (step S538). That is to say, because a plurality of document images is arranged in step S538, the image of each document image is smaller than a case where a single document image is displayed. As a result, the program information change processor 204 is capable of generating a display in which the size (display form) of the displayed document images is changed according to the reception date and time.

In terms of the determination of whether a reception date and time is old or new, for example, the program information change processor 204 may determine that document files that are newly acquired when the document files are acquired have a new reception date and time, and determine that other document files have an old reception date and time. Note that the program information change processor 204 may determine that a reception date and time is new when the reception date and time is included in a prescribed time (such as the last 5 minutes), and may determine that a reception date and time is old if it is not included in the prescribed time.

Then, the program information change processor 204 adds to the playlist 236 so that the images generated in step S534, step S536, and step S538 are displayed (step S138).

Furthermore, the program information change processor 204 determines whether or not the reception list image generated in step S534, and the document images generated in step S536 and S538 have been displayed (step S540). If the reception list image and the document images have been displayed, the reception list image and the document images are deleted, and the content added in the processing of step S138 is deleted from the playlist 236 (step S542→step S544).

Next, an operation example of the present embodiment will be described. As an operation example of the present embodiment, FIGS. 17A to 17C are diagrams showing a display screen displayed on the display unit 320. FIG. 17A is a diagram showing a reception list image displayed on the display unit 320. As shown in FIG. 17A, the date and time that the FAX was received, and the sender information of the FAX image data is displayed as a list.

FIG. 17B is a document image of the document file having a new reception date and time. Furthermore, FIG. 17C is an image in which a plurality of document images of document file having an old reception date and time is arranged. As a result, by changing the display of the document image according to the reception date and time, it is possible to indicate to the user a distinction between FAX images that have been newly received, and other FAX images.

Note that, when being applied to the second embodiment, the processing from step S532 onwards is performed after the processing that acquires the document files, such that a control that displays the reception list image and document images according to the date and time information is performed. Furthermore, when being applied to the third embodiment and the fourth embodiment, the processing from step S532 onwards is performed after the processing that extracts the document files, such that a control that displays the reception list image and document images according to the date and time information is performed.

Furthermore, the processing was described assuming that the reception history information is generated in the display control device 20 from the document files, However, the reception history information may be generated in the image forming device 10 and acquired by the display control device 20. In this case, in the processing that generates the document files, the controller 100 of the image forming device 10 stores reception history information, which includes the file name of the document files, the reception date and time of the associated FAX image data, and the sender information, in the storage unit 180. Furthermore, the reception history information may also be transmitted when the document files are transmitted to the display control device 20 in step S110.

Furthermore, the display control device 20 may control the document files having an old reception date and time such that the document images are arranged in a horizontal or vertical direction, and scroll display the document images on the display unit 320.

Furthermore, in the present embodiment, the description assumed that display control device 20 generates an image in which a plurality of document images having an old reception date and time are arranged, and the image is added to the playlist 236. However, a plurality of document images having an old reception date and time may be displayed by other processing. For example, first program information 232 that displays the reception list image and the document image having a new reception date and time, and second program information 232 that displays document images having an old reception date and time may be stored in the storage unit 230. The second program information 232 stores a plurality of playlists 236. The program information change processor 204 stores the reception list image and the document image having a new reception date and time as the content 234 of the first program information 232, and stores a playlist 236 that displays the stored content 234 in the first program information 232. Furthermore, the program information change processor 204 stores the document images having an old reception date and time as the content 234 of the second program information 232, and stores the playlists 236 that display the stored content 234 in the second program information 232. As a result of reading the first program information 232 and the second program information 232, the content display controller 202 is capable of displaying the reception list image, the document image having a new reception date and time, and the document images having an old reception date and time on the display device 30.

According to the present embodiment, the display control device is capable of displaying an image containing reception date and time information such as a reception list image, and displaying document images in a display form corresponding to the reception date and time. Consequently, the people in the surroundings of the display device are capable of confirming FAX image data that has been newly received, and FAX image data that has been previously received via the display device.

6. Sixth Embodiment

Next, a sixth embodiment will be described. The sixth embodiment is an embodiment in which the display control device 20 displays management information on the display device 30. The management information is information indicating the state of the image forming device 10 that generated the document file.

The present embodiment can be applied to any of the first to fifth embodiments. However, a case where it is applied to the first embodiment will be described. In this case, FIG. 2 of the first embodiment is replaced with FIG. 18. In addition, the same reference numerals are given to the same functional units and processing, and the description will be omitted.

Figure 18:
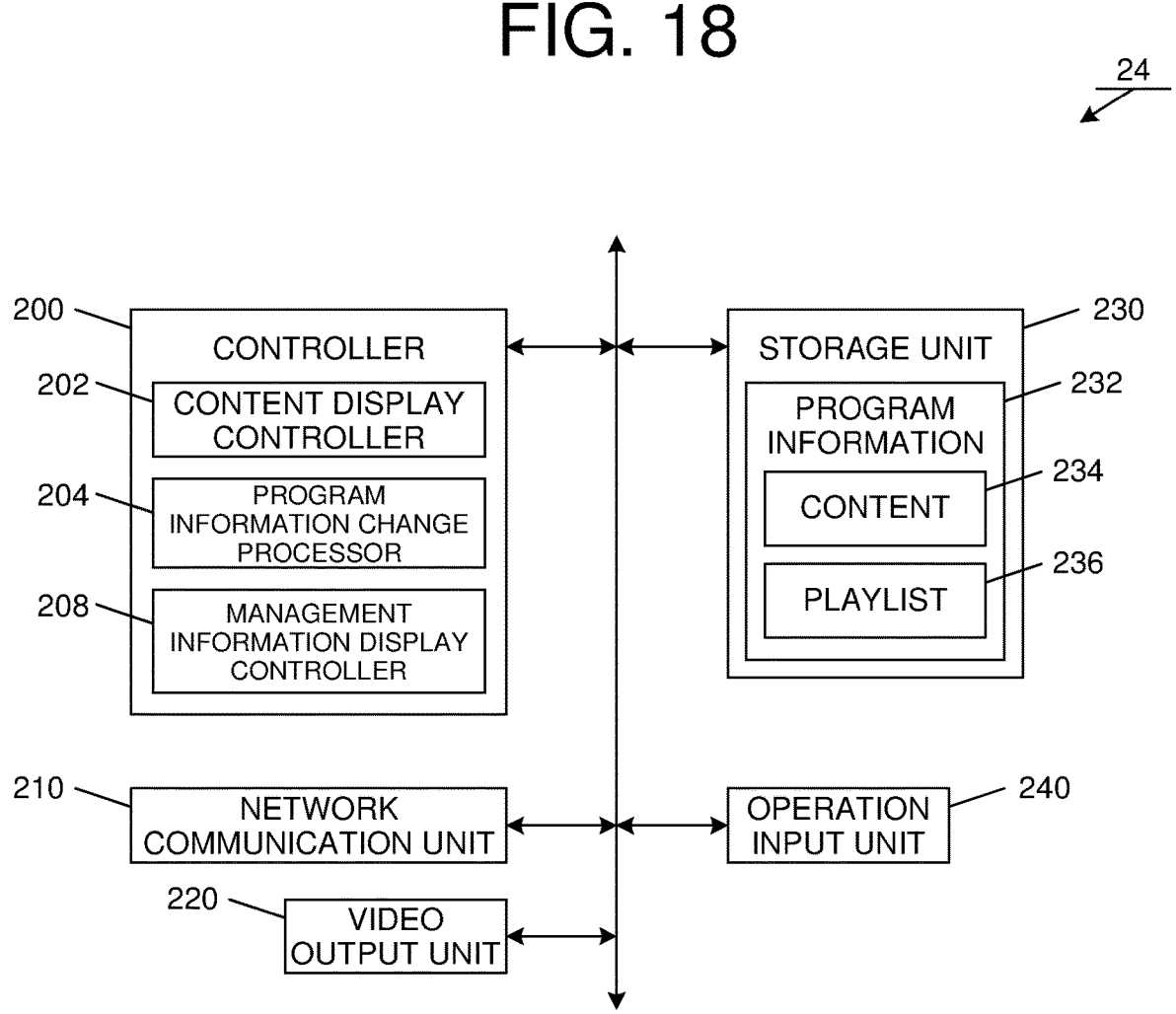
FIG. 18 is a diagram for describing a functional configuration of a display control device according to a sixth embodiment.

The functional configuration of the display control device 24 of the present embodiment will be described with reference to the drawings. As shown in FIG. 18, unlike the display control device 20, the controller 200 of the display control device 24 further includes a management information display controller 208.

Figure 19:
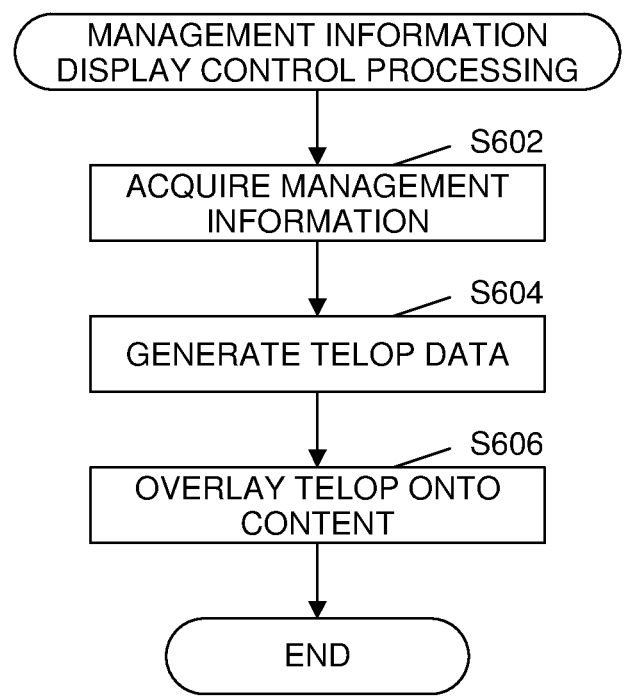
FIG. 19 is a flow diagram showing the flow of management information display control processing according to the sixth embodiment.

The management information display controller 208 executes management information display control processing. The management information display control processing will be described with reference to FIG. 19.

Firstly, the management information display controller 208 acquires management information from the image forming device 10. For example, the management information display controller 208 uses an SNMP (Simple Network Management Protocol) to acquire an MIB (Management Information Base) from the image forming device 10.

Then, the management information display controller 208 generates telop data based on the acquired management information, and performs a control that displays the generated telop data overlaid on the content (step S604→step S606). For example, the management information display controller 208 generates, as the telop data, telop data containing messages and the like which indicate the state of the image forming device 10, such as the number of jobs waiting to be printed, error information and error messages relating to paper jams and the like, and the amount of toner remaining. As described in the second embodiment, the overlay display method may be a method that combines the telop data with a video signal, or a method that uses the playlist 236 to generate the overlay display.

Figure 20:
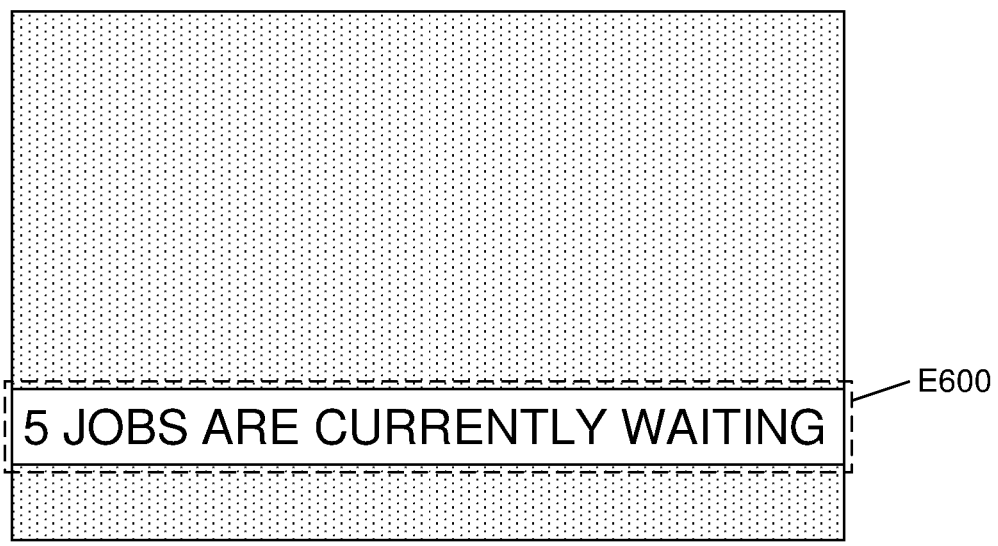
FIG. 20 is a diagram showing an operation example according to the sixth embodiment.

Next, an operation example of the present embodiment will be described. As an operation example of the present embodiment, FIG. 20 is a diagram showing a display screen displayed on the display unit 320 which is displaying telop data of the management information. As indicated by the area E600 of FIG. 20, the state of the image forming device 10 (the number of jobs waiting to be printed in the example of FIG. 20) is overlaid on the content.

According to the present embodiment, the people in the surroundings of the display device are able to confirm the state of the image forming device via the display device. For example, by displaying the number of jobs waiting to be printed, it is possible to confirm whether or not printing can be immediately performed by the image forming device.

7. Modifications

The present invention is not limited to the embodiments described above, and various changes may be made. That is to say, embodiments obtained by combining technical means appropriately changed without departing from the scope of the present invention are also included in the technical scope of the present invention.

Furthermore, the embodiments described above have portions described separately for convenience of description. However, these may of course be combined within a technically possible range.

Furthermore, in the embodiments, the program that operates in each device is a program that controls a CPU or the like (a program that causes a computer to function) so as to realize the functions of the embodiments described above. Further, the information handled by these devices is temporarily stored in a temporary storage device (such as a RAM) at the time of processing, and subsequently stored in storage devices such as various ROMs (Read Only Memory) and HDDs. Then, the information is read, corrected, and written as necessary by the CPU.

Here, the recording medium that stores the program may be any of a semiconductor medium (such as a ROM or a non-volatile memory card), an optical recording medium or magneto-optical recording medium (such as a DVD (Digital Versatile Disc), an MO (Magneto Optical Disc), an MD (Mini Disc), a CD (Compact Disc), or a BD (Blu-ray Disc) (registered trademark)), a magnetic recording medium (such as a magnetic tape or a flexible disk), and the like. Furthermore, in addition to loading and executing the program to realize the functions of the embodiments described above, the functions of the present invention can sometimes be realized by joint processing between an operating system or other application programs based on the instructions from the program.

Moreover, when distributed in the market, the program can be stored and distributed in a portable recording medium, or transferred to a server computer connected via a network such as the Internet. In this case, the storage device of the server computer is of course included in the present invention.

BRIEF DESCRIPTION OF THE REFERENCE SYMBOLS

1 Display system
10 Image forming device
100 Controller
110 Network communication unit
120 FAX communication unit
130 Display unit
140 Operation input unit
150 Document reader
160 Image processor
170 Image former
180 Storage unit
182 Document data storage area
184 FAX image data storage area
186 Read image data storage area
188 Document file storage area
20, 22, 24 Display control device
200 Controller
202 Content display controller
204 Program information change processor
206 Overlay display controller
208 Management information display controller
210 Network communication unit
220 Video output unit
230 Storage unit
232 Program information
234 Content
236 Playlist
30 Display device
300 Controller
310 Video input unit
320 Display unit

What is claimed is:

1. A display control device including:
a storage unit that stores content and a playlist; and
a controller that displays the content on a display device based on the playlist; wherein
the controller acquires additional content when additional content is stored in a prescribed storage area, and displays the additional content on the display device, and
the controller deletes a file name of the displayed additional content and a display time associated with the file name from the playlist when the controller determined that the additional content has been displayed.

2. The display control device according to claim 1, wherein
the content is received from an external device.

3. The display control device according to claim 1, wherein
the controller adds the additional content to the playlist if the additional content is acquired.

4. The display control device according to claim 1, wherein
the controller displays the additional content overlaid on the displayed content when the additional content is displayed.

5. The display control device according to claim 1, wherein
if the additional content is content based on an image transmitted by a facsimile communication, the controller determines whether or not to display the additional content based on sender information of the image.

6. The display control device according to claim 5, wherein
the controller determines whether or not to display the additional content based on the sender information and information that associates whether or not to display the content associated with the sender information.

7. The display control device according to claim 5, wherein
if the additional content is content based on an image transmitted by a facsimile communication, the controller displays the additional content on the display device in a display form according to date and time information associated with the additional content.

8. The display control device according to claim 1, wherein
the controller displays the additional content on the display device if an image associated with the additional content has not been printed by an image forming device and a determination to display has been made.

9. The display control device according to claim 8, wherein
the controller acquires management information acquired from the image forming device, and displays information based on the acquired management information on the display device.

10. The display control device according to claim 9, wherein
the information based on the management information is at least one of a number of jobs waiting to be printed or error information.

11. The display control device according to claim 1, wherein
the additional content is content including an image generated by an image forming device.

12. A display control method including:
storing content and a playlist;
displaying the content on a display device based on the playlist;
acquiring additional content when additional content is stored in a prescribed storage area, and displaying the additional content on the display device; and
deleting a file name of the displayed additional content and a display time associated with the file name from the playlist when the additional content has been displayed.

13. A display system including an image forming device, and a display control device that controls a display device, wherein
the image forming device includes
a content generator that generates content, and
a content storage unit that stores the content in a prescribed storage area,
the display control device includes
a storage unit that stores content and a playlist, and
a controller that displays the content on the display device based on the playlist, and
the controller acquires content when content is stored in the prescribed storage area, and displays the acquired content on the display device, and
the controller deletes a file name of the displayed content and a display time associated with the file name from the playlist when the controller determined that the content has been displayed.

14. The display system according to claim 13, wherein
if the content generator generates content based on an image transmitted by a facsimile communication, associates sender information of the image with the content, and
if the controller acquires content stored in the prescribed storage area and the acquired content is content generated based on an image transmitted by a facsimile communication, determines whether or not to display the acquired content based on the sender information associated with the acquired content.

\* \* \* \* \*